UNITED STATES PATENT OFFICE.

HERMAN POOLE, OF NEW YORK, N. Y.

PROCESS OF MAKING PHOSPHATES.

SPECIFICATION forming part of Letters Patent No. 598,182, dated February 1, 1898.

Application filed October 10, 1896. Serial No. 608,493. (No specimens.)

*To all whom it may concern:*

Be it known that I, HERMAN POOLE, a citizen of the United States, residing in the city, county, and State of New York, have invented certain new and useful Improvements in Treating Native Aluminium Phosphates, of which the following is a specification.

My invention relates to the chemical reduction of native aluminium phosphate; and it has for its object in part the recovery of the phosphorus contained therein in the form of tribasic sodium phosphate in a pure form and at a moderate cost and in part the recovery of the aluminium sulfate also in a pure state.

In carrying out my invention the native aluminium phosphate is first pulverized and then boiled in a strong solution of caustic soda. After reaction the solution becomes mainly one of sodium aluminate and sodium phosphate, and this solution is filtered to remove the impurities, mainly iron oxids. The clear filtrate is now mixed with an aqueous solution of sodium silicate, whereby the silica and alumina combine to form aluminium silicate, which is insoluble in the alkaline solution. Some of the soda may also enter into the combination. The above reaction removes the alumina from the solution, leaving tribasic sodium phosphate, which is then crystallized out of the solution in a very pure state and fit for the market.

While exact proportions of the substances employed are not essential to the carrying out of my process, the combining proportions in the reactions, known to all chemists, being kept in view at all times, the directions given below will produce good results.

Take about one hundred pounds of the pulverized native aluminium phosphate and from seventy-five to one hundred pounds of caustic soda. Dissolve the soda in from fifty to seventy-five gallons of boiling water and gradually stir in the phosphate. Then boil for from two to four hours, or until the reaction is complete. Filter the solution, and while it is boiling and open to the atmosphere add from one hundred to one hundred and twenty-five pounds (or an excess) of syrupy sodium silicate. When reaction takes place, the aluminium silicate will be precipitated, and the solution of tribasic sodium phosphate is drawn off and the salt allowed to crystallize out in a well-known way. This salt is then dried and put up for sale.

The aluminium silicate precipitated as above is decomposed by heating it with about equal weight of fine degree sulfuric acid, the reaction yielding aluminium sulfate and silica, which are separated by filtration. The silica thus regenerated is again used in the process, and the aluminium sulfate may be sold or converted into alum of commerce by well-known methods.

The above-described mode is the preferred form of procedure; but it may be departed from in some respects. For example, instead of sodium silicate some other soluble silicate may be employed in equivalent proportions, or gelatinous silica may be used. After the first reaction some tribasic sodium phosphate may be and preferably will be crystallized out of the solution before the addition of the silicate.

I am aware that in the manufacture of phosphate of lime for fertilizers the aluminium phosphate has been treated with caustic soda and lime, the resulting phosphate of lime being then converted into superphosphate by treatment with sulfuric acid. This I do not claim, and so far as I am aware the process has not proved successful commercially.

I am also aware that a solution of the aluminium phosphate in caustic soda has been treated with silica under pressure in order to produce a dibasic sodium phosphate. This I do not claim.

My purpose is to produce two merchantable products—namely, tribasic sodium phosphate and aluminium sulfate—and the characteristically novel feature of the process is the separation of the alumina and phosphoric acid from an alkaline solution containing them by means of silica, which combines with the alumina to form a compound insoluble in the solution and yields a tribasic phosphate.

Having thus described my invention, I claim—

1. The herein-described method of separating alumina from phosphoric acid in an alkaline solution of the same, which consists in adding silica to said solution while hot, and open to the atmosphere, whereby a tribasic phosphate is attained.

2. The herein-described method of treating native aluminium phosphate, which consists in subjecting it to heat in an aqueous solution of caustic soda, then adding to the solution while open to the atmosphere a silicate for the separation of the alumina, and then crystallizing out the sodium phosphate.

3. The herein-described method of treating native aluminium phosphate in the production of tribasic sodium phosphate therefrom, which consists in mixing the pulverized native phosphate with a boiling solution of caustic soda until the reaction is completed, then filtering, then adding to the solution silica in the form described, then boiling while open to the atmosphere until the reaction is completed, and then crystallizing out the tribasic sodium phosphate in a pure state.

4. The herein-described method of treating native aluminium phosphate, which consists in first mixing the pulverized native phosphate with a boiling solution of caustic soda to decompose the native phosphate, then filtering, then adding silica to the boiling solution while open to the atmosphere, whereby the alumina is precipitated as a silicate, then crystallizing out the tribasic sodium phosphate, and finally treating the aluminium silicate with sulfuric acid whereby aluminium sulfate is formed.

In witness whereof I have hereunto signed my name in the presence of two subscribing witnesses.

HERMAN POOLE.

Witnesses:
HENRY CONNETT,
PETER A. ROSS.